United States Patent
Kuo

(10) Patent No.: US 7,798,828 B2
(45) Date of Patent: Sep. 21, 2010

(54) COVER ASSEMBLY

(75) Inventor: Ling-Mei Kuo, Taipei County (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 48 days.

(21) Appl. No.: 12/394,213

(22) Filed: Feb. 27, 2009

(65) Prior Publication Data

US 2010/0048048 A1     Feb. 25, 2010

(30) Foreign Application Priority Data

Aug. 19, 2008   (CN) .................. 2008 1 0304038

(51) Int. Cl.
 *H01R 13/44* (2006.01)
(52) U.S. Cl. .................. 439/142; 439/138; 439/367
(58) Field of Classification Search ............ 439/138, 439/142, 367

See application file for complete search history.

(56) References Cited

U.S. PATENT DOCUMENTS

| 7,500,866 | B2 * | 3/2009 | Gennai et al. ........... 439/367 |
| 7,572,993 | B2 * | 8/2009 | Chen et al. ........... 200/302.1 |
| 7,611,371 | B2 * | 11/2009 | Guo ........................ 439/367 |
| 2005/0014408 | A1 * | 1/2005 | Swiatek et al. ......... 439/215 |
| 2006/0178028 | A1 * | 8/2006 | Swiatek et al. ......... 439/215 |
| 2010/0048048 | A1 * | 2/2010 | Kuo ........................ 439/142 |

FOREIGN PATENT DOCUMENTS

GB          2168549     *   6/1986

* cited by examiner

*Primary Examiner*—James Harvey
(74) *Attorney, Agent, or Firm*—Steven M. Reiss

(57) ABSTRACT

A cover assembly for a portable electronic device includes a body member defining a jack and a cover member defining a through hole at one end. The cover member pivots relative to the body member to cover or expose the jack.

4 Claims, 6 Drawing Sheets

COVER ASSEMBLY

BACKGROUND

1. Field of the Invention

The present invention relates to device assembly and, particularly, to a cover assembly used in a portable electronic device.

2. Description of Related Art

Portable electronic devices (e.g., mobile phones) usually have earphone holes for insertion of earphones. Covers may be used to cover and protect the earphone holes from e.g., water and dust.

A typical earphone cover is often made of rubber and is fixedly connected to the mobile phone by a flexible strip adjacent to the earphone hole. The covering/exposing of the earphone hole is achieved by bending the earphone cover towards/away from the earphone hole around the flexible strip.

However, the flexible strip may not sustain continued use and can easily break.

Therefore, there is room for improvement within the art.

BRIEF DESCRIPTION OF THE DRAWINGS

Many aspects of the cover assembly can be better understood with reference to the following drawings. These drawings are not necessarily drawn to scale, the emphasis instead being placed upon clearly illustrating the principles of the present cover assembly. Moreover, in the drawings like reference numerals designate corresponding members throughout the several views.

DETAILED DESCRIPTION OF EXEMPLARY EMBODIMENT

Figure 1:
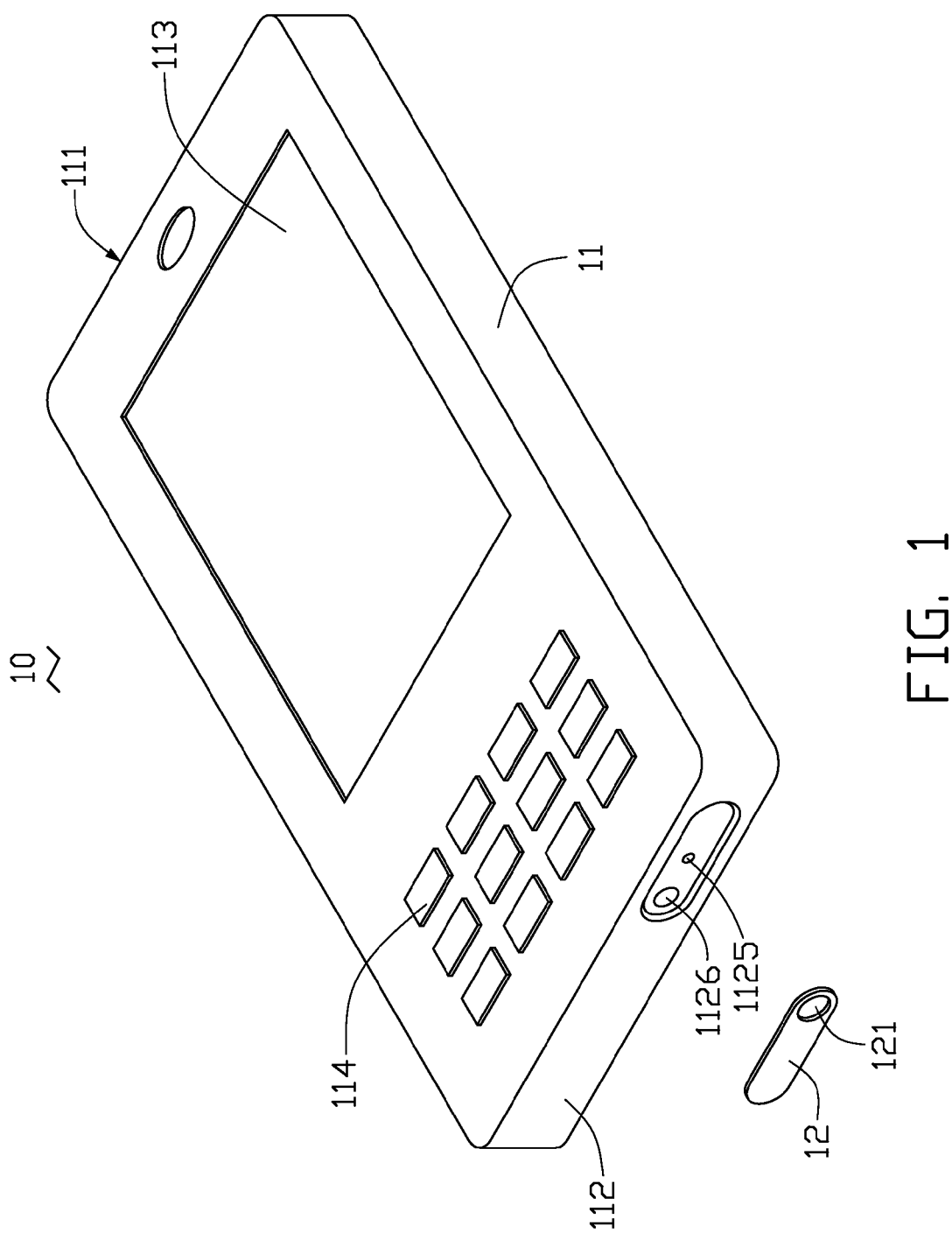
FIG. 1 is an exploded, isometric view of a cover assembly, in accordance with an exemplary embodiment.
Figure 2:
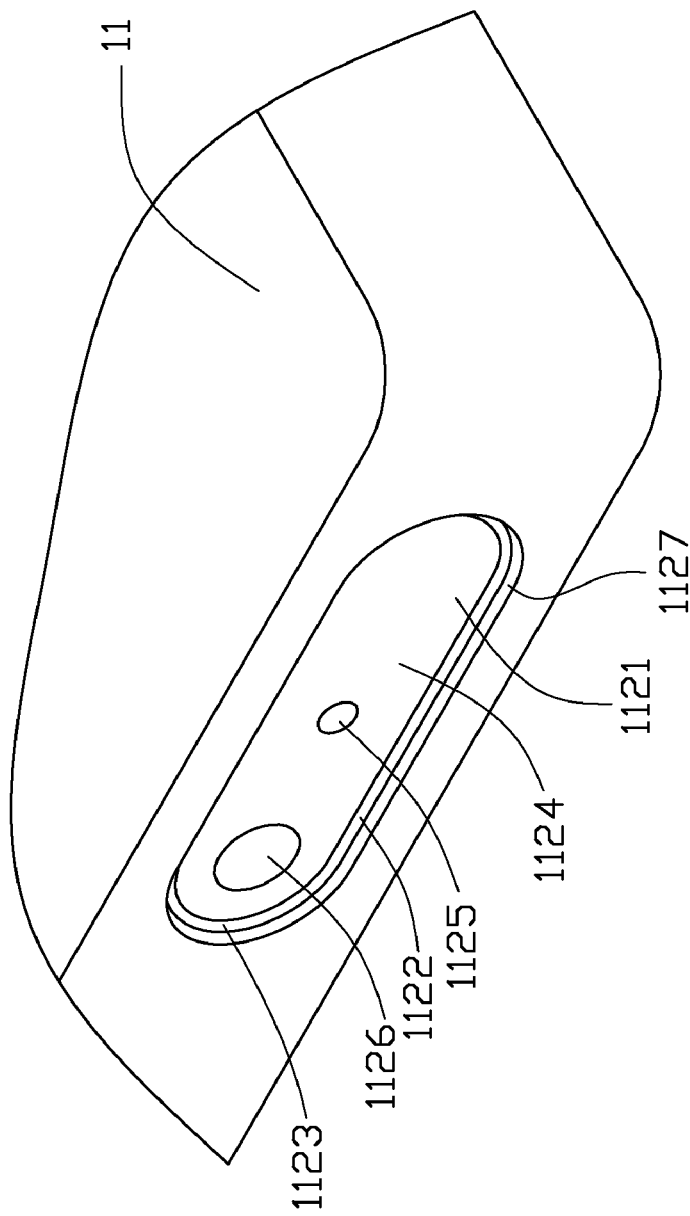
FIG. 2 is a partially enlarged view of the cover assembly shown in FIG. 1.
Figure 3:
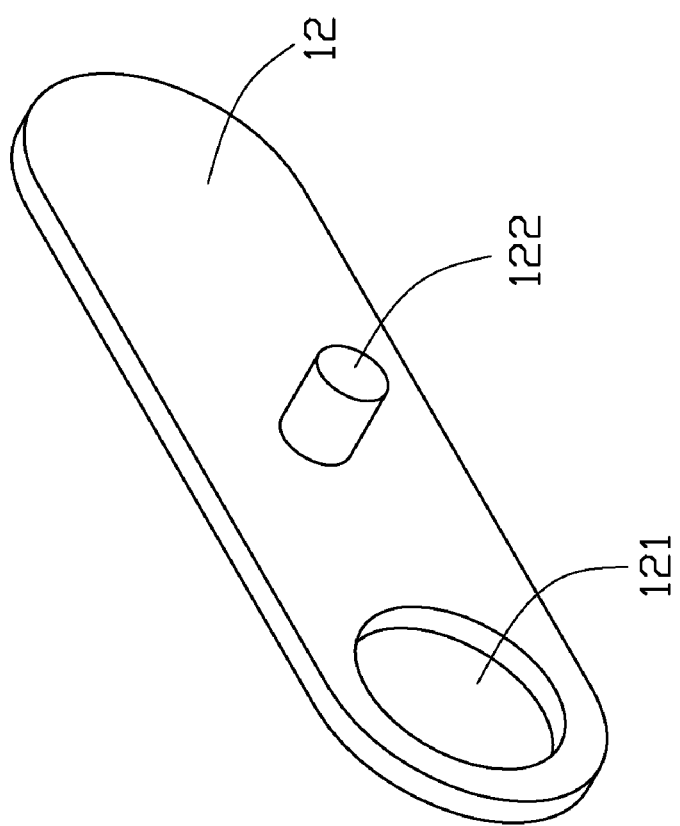
FIG. 3 is another isometric view of the cover assembly shown in FIG. 1.

FIGS. 1 through 3 show an exemplary cover assembly 10 used in a portable electronic device such as a mobile phone. The cover assembly 10 includes a body member 11 and a cover member 12.

The body member 11 can be a housing of the portable electronic device. The body member 11 includes a top end 111 and an opposite bottom end 112. The body member 11 has a display 113 arranged adjacent to the top end 111 and a keypad 114 arranged adjacent to bottom end 112.

Referring also to FIG. 2, the bottom end 112 defines a cavity 1121, formed by two parallel planar walls 1122, two opposite curved walls 1123 and a bottom wall 1124. The bottom wall 1124 defines a round pivoting hole 1125 and a round jack 1126. The pivoting hole 1125 is located at a center of the bottom wall 1124. The jack 1126 is located at one end of the bottom wall 1124. The planar walls 1122 and the curved walls 1123 connect to the bottom end 112 via a plurality of guiding walls 1127. The guiding walls 1127 guide the cover member 12 into and out of the cavity 1121.

Referring to FIG. 3, the cover member 12 is elastic and configured to be received in the cavity 1121. A through hole 121 is defined at one end of the cover member 12. A pivoting column 122 protrudes from the center of the cover member 12. The pivoting column 122 is pivotally received in the pivoting hole 1125.

Figure 4:
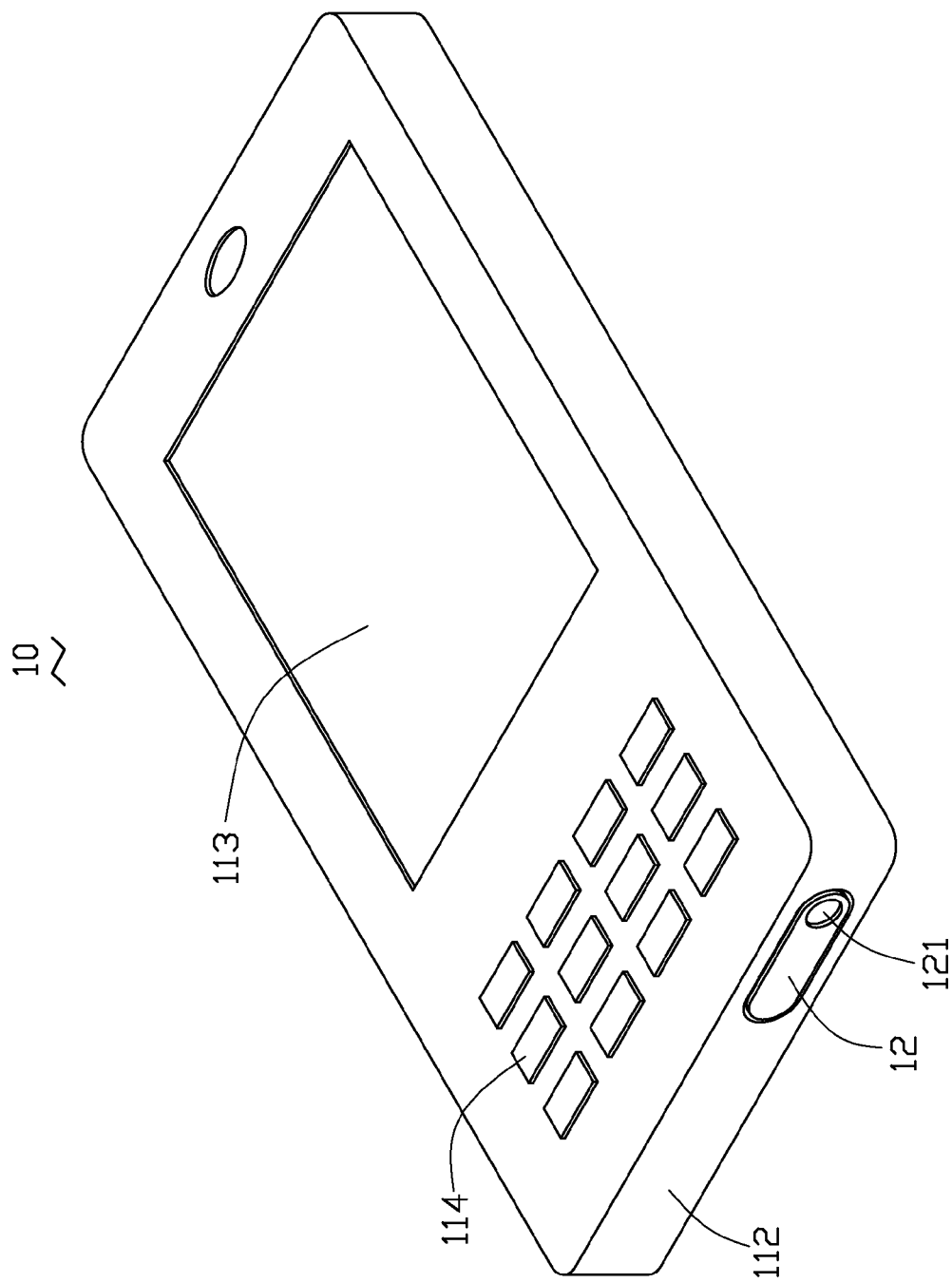
FIG. 4 is an assembly view of the cover assembly shown in FIG. 1.
Figure 5:
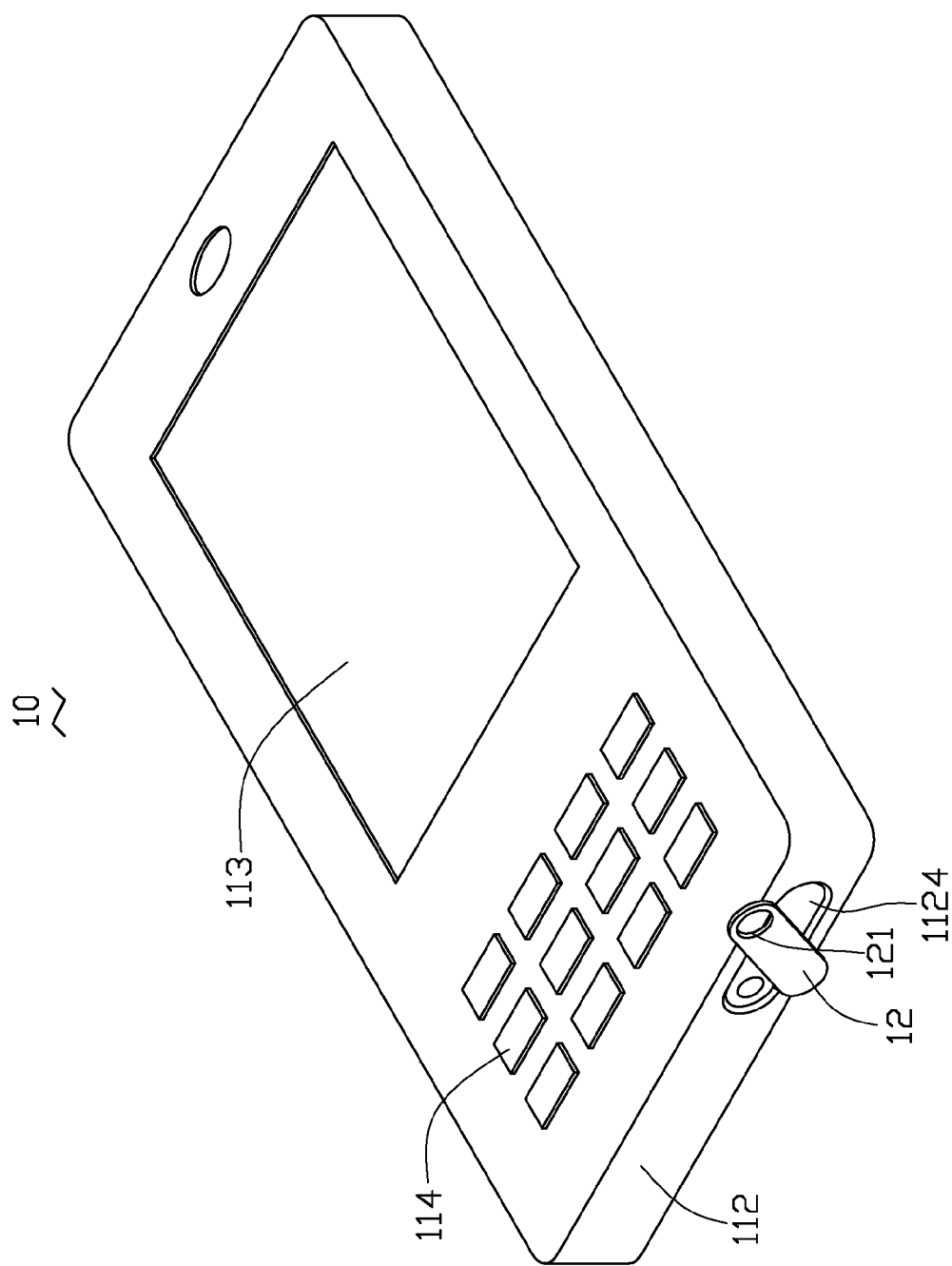
FIG. 5 shows a first position of the cover assembly shown in FIG. 3, corresponding to an opening/closing operation thereof.
Figure 6:
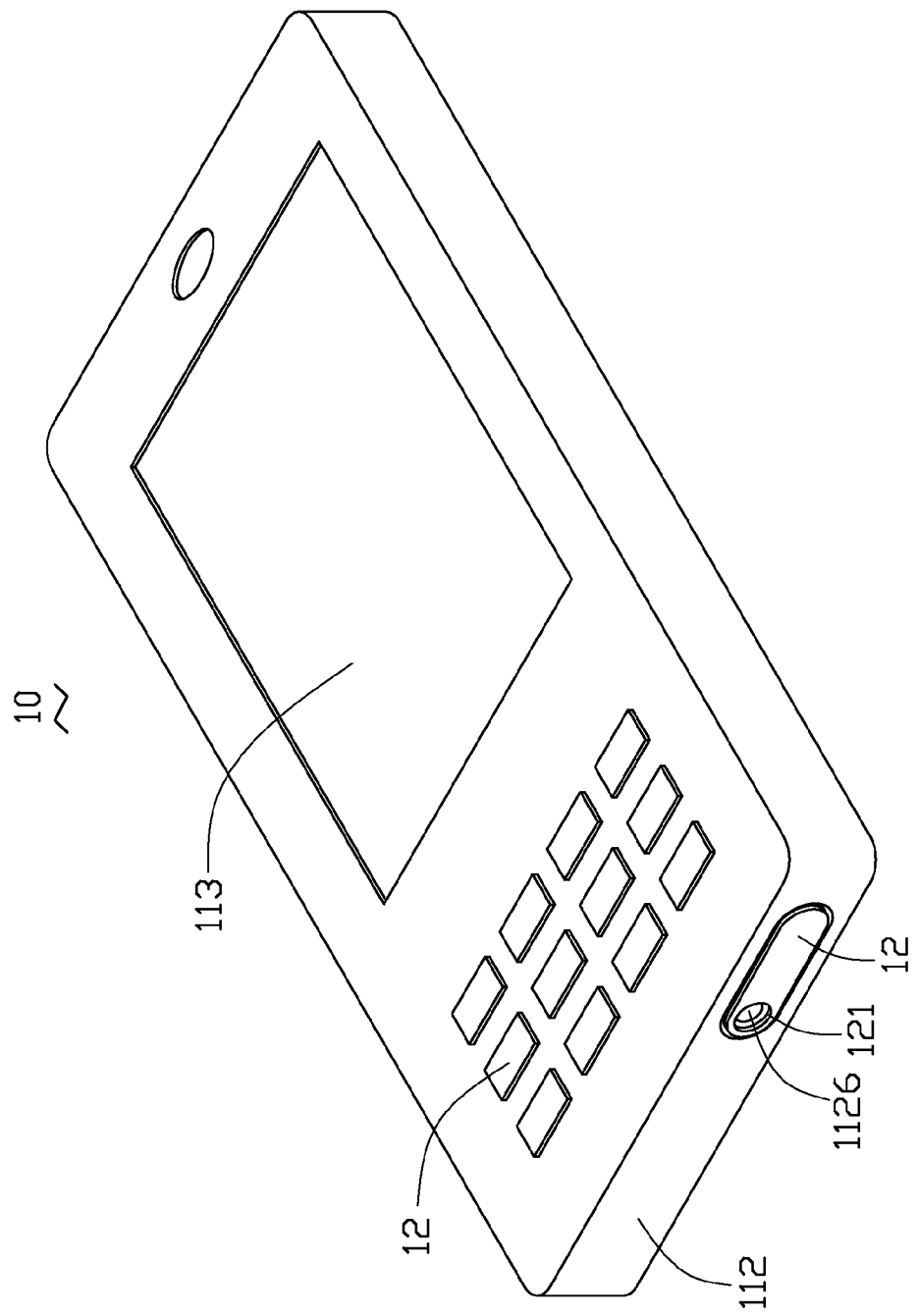
FIG. 6 shows a second position of the cover assembly shown in FIG. 3, corresponding to an opening/closing operation thereof.

Referring to FIG. 4, the jack 1126 is covered by the cover member 121. FIGS. 5 and 6 show the cover member 12 moving from the described closed position to an open position. In use, the cover member 12 slides out of the cavity 1121 until pivotable on the pivoting column 122 about 180 degrees (°) and slides into the cavity 1121 again, guided by the guiding walls 1127. During this stage, the through hole 121 is co-axial with the jack 1126 and the earphone connected through jack 1126 is functional.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of members within the principles of the invention to the full extent indicated by the broad general meaning of the terms, in which the appended claims are expressed.

What is claimed is:

1. A cover assembly, comprising:
    a body member defining a jack;
    a cover member defining a through hole at one end, the cover member pivoting relative to the body member covering the jack;
    the body member defines a cavity used to receive the cover member therein, the cover member is rotatably mounted to a bottom wall of the cavity, the jack is defined at one end of the bottom wall.

2. The cover assembly as claimed in claim 1, wherein the bottom wall defines a pivoting hole at a center thereof, in which a corresponding pivoting column protruding from a center of the cover member, is rotatably received.

3. The cover assembly as claimed in claim 1, wherein the cover member defines a pivoting hole at a center thereof, in which a corresponding pivoting column protruding from a center of the bottom wall is rotatably received.

4. The cover assembly as claimed in claim 1, wherein a plurality of guiding walls are arranged adjacent to the inner walls of the cavity, and guide the cover member sliding into and out of the cavity.

* * * * *